United States Patent
Scofield

(10) Patent No.: US 9,421,726 B2
(45) Date of Patent: Aug. 23, 2016

(54) METHOD OF MAKING INJECTION MOLDED FOOTWEAR

(71) Applicant: Chinook Asia LLC, Lake Oswego, OR (US)

(72) Inventor: Robert K. Scofield, Lake Oswego, OR (US)

(73) Assignee: Chinook Asia LLC, Lake Oswego, OR (US)

( * ) Notice: Subject to any disclaimer, the term of this patent is extended or adjusted under 35 U.S.C. 154(b) by 192 days.

(21) Appl. No.: 13/838,382

(22) Filed: Mar. 15, 2013

(65) Prior Publication Data

US 2014/0259461 A1    Sep. 18, 2014

(51) Int. Cl.
*B29D 35/00* (2010.01)
*B29D 35/12* (2010.01)

(52) U.S. Cl.
CPC ........... *B29D 35/122* (2013.01); *B29D 35/126* (2013.01); *B29D 35/128* (2013.01)

(58) Field of Classification Search
CPC .......... B29C 2045/14098; B29C 2045/14213; B29C 44/5681; B29D 35/0027
See application file for complete search history.

(56) References Cited

U.S. PATENT DOCUMENTS

| 4,266,750 | A  | * | 5/1981  | Gallizia ........................ 249/65 |
| 5,647,150 | A  | * | 7/1997  | Romanato et al. .......... 36/117.1 |
| 6,464,907 | B2 | * | 10/2002 | Gross .............................. 264/21 |
| 8,361,369 | B1 |   | 1/2013  | Cook |
| 2004/0020077 | A1 | * | 2/2004 | Thomas et al. ..................... 36/4 |
| 2013/0133229 | A1 |   | 5/2013 | Ludemann et al. |
| 2013/0239439 | A1 |   | 9/2013 | Ludemann et al. |

FOREIGN PATENT DOCUMENTS

| CA | 2755330 | * | 12/2011 |
| GB | 2146282 | * | 4/1985  |

* cited by examiner

*Primary Examiner* — Jill Heitbrink
(74) *Attorney, Agent, or Firm* — Chernoff, Vilhauer, McClung & Stenzel, LLP

(57) ABSTRACT

A method of making injection molded footwear includes placing a last into the internal cavity of a mold with the last and cavity being configured such that there is a space between them which is greater than the desired thickness of the footwear skin. An elastically deformable scrim is placed over the last before the last is paced in the mold. The scrim has a first thickness when not compressed and a second thickness when compressed. The difference between the first and second thickness is approximately equal to the desired thickness of the footwear skin.

10 Claims, 6 Drawing Sheets

METHOD OF MAKING INJECTION MOLDED FOOTWEAR

CROSS-REFERENCE TO RELATED APPLICATIONS

Not applicable.

BACKGROUND OF THE INVENTION

Referring to FIG. 1 of the drawings, shoes, boots, and other footwear are often made by injection molding. In this process, a mold contains a cavity that defines the outer surface of the skin of the footwear upper, and a last, which is placed in the mold, has an outer surface that defines the inner surface of the skin. The last and mold are configured such that there is a space between the mold and the last. A sock made from neoprene or a similar material is placed on a last before the last is placed in the mold. The thickness of the skin will be the width of the space between the wall of the mold cavity and the outer surface of the last, less the thickness of the sock. This sock acts as a release agent between the last and the mold. The sock becomes bonded to the thermoplastic material that is injected into the mold when the material cools and creates a lining which provides more comfort than the skin material alone would provide. With injection-molded footwear, it is desirable that the thickness of the skin be as small as possible in order to reduce the weight of the footwear and still provide the desired rigidity and strength. With the prior art method of making injection molded footwear, obtaining a thin skin is difficult, and in order to prevent the footwear from being too thin it may be necessary to make it thicker than desired. While the sock is typically quite thin, it can have enough variation in its thickness that it may not be possible to make the shoe as thin as desired without making some portions of it too thin.

SUMMARY OF THE INVENTION

The subject method of making injection-molded footwear comprises replacing the sock with an elastically deformable scrim having a first thickness when not compressed and a second thickness when substantially compressed, where the difference between the first and second thicknesses is approximately equal to the desired thickness of the upper skin of the resulting footwear.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

Figure 1:
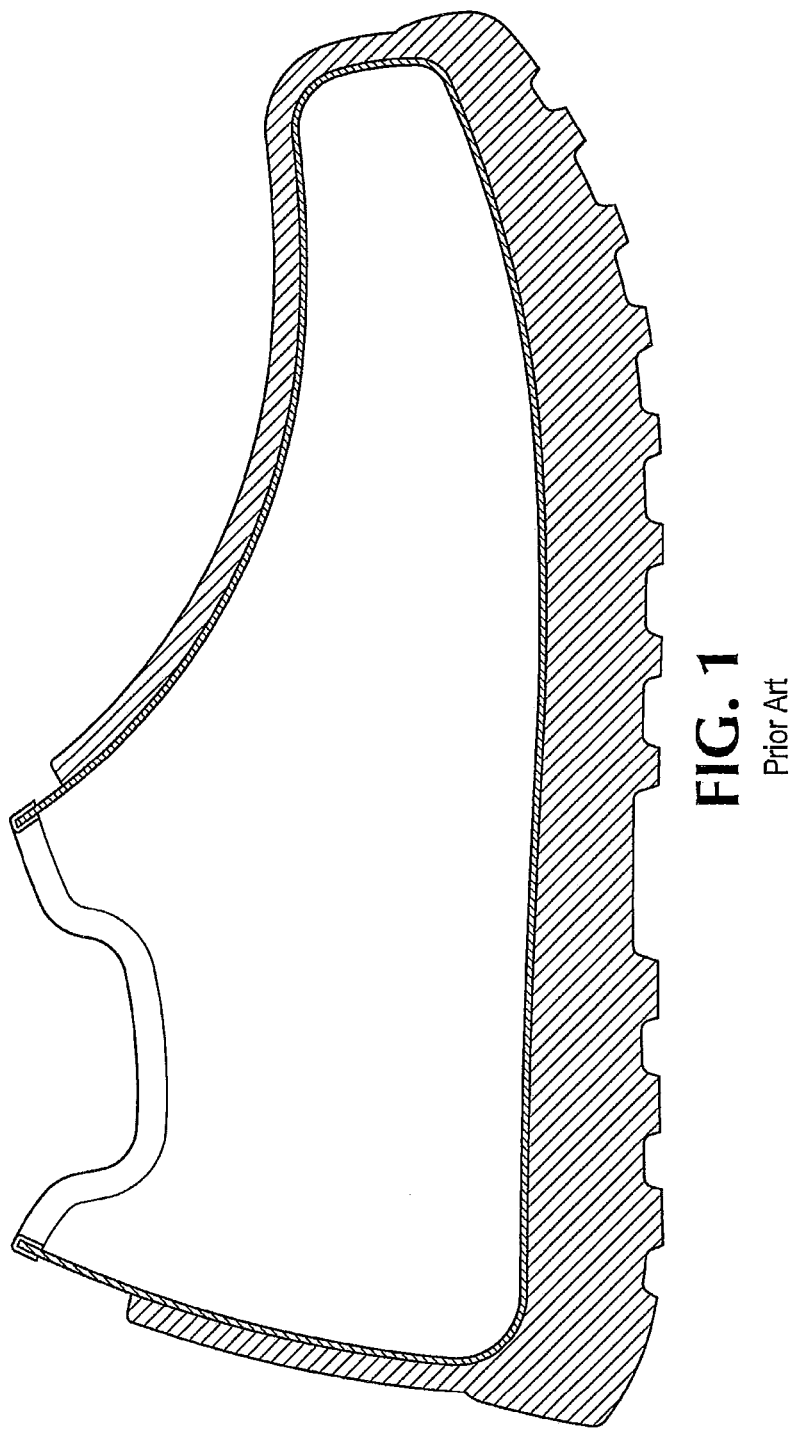
FIG. 1 is a cross-sectional view of footwear made with the prior art injection molding method.
Figure 2:
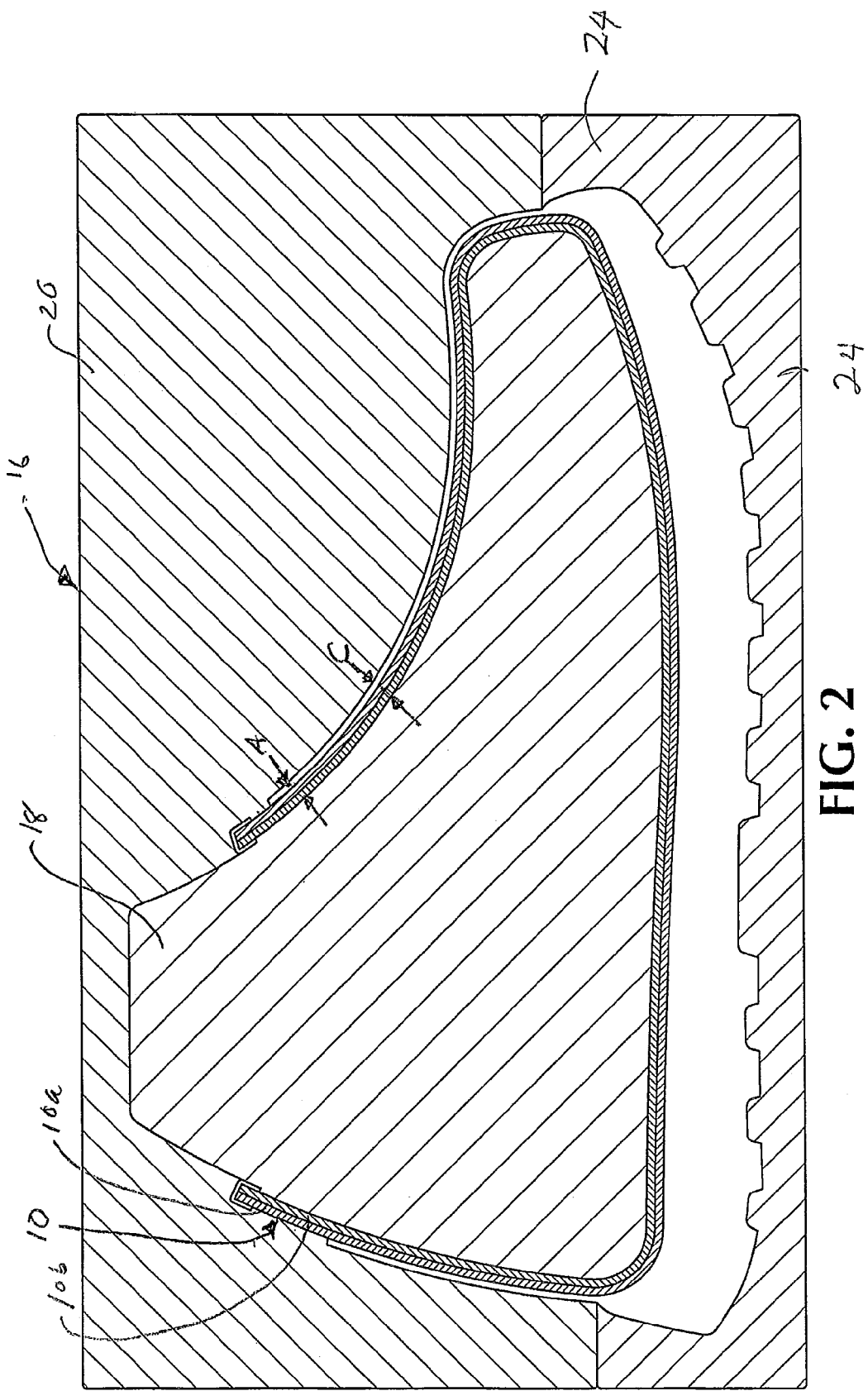
FIGS. 2 and 3 are cross-sectional views showing the steps of making injection-molding footwear by the subject invention.
Figure 3:
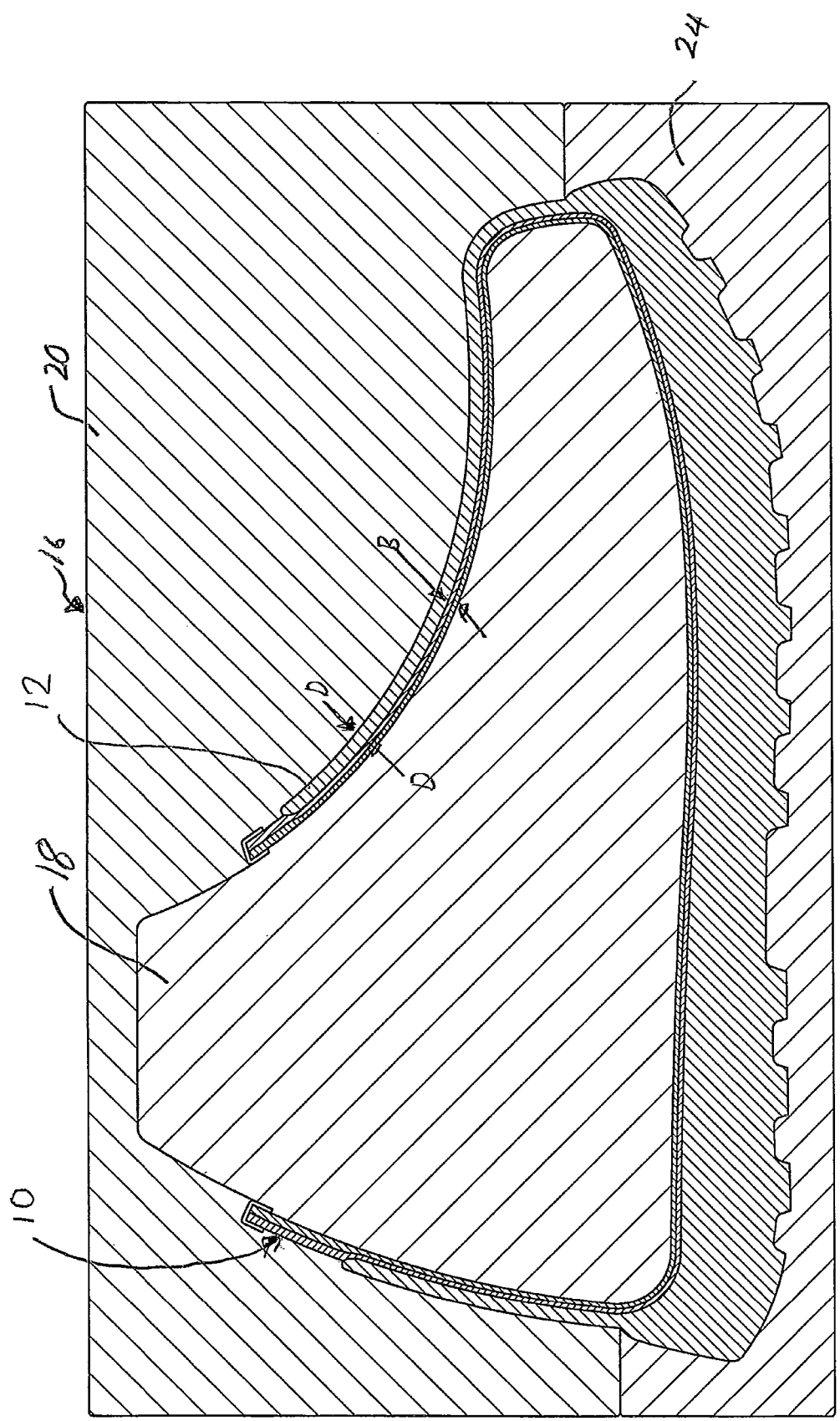
Figure 4:
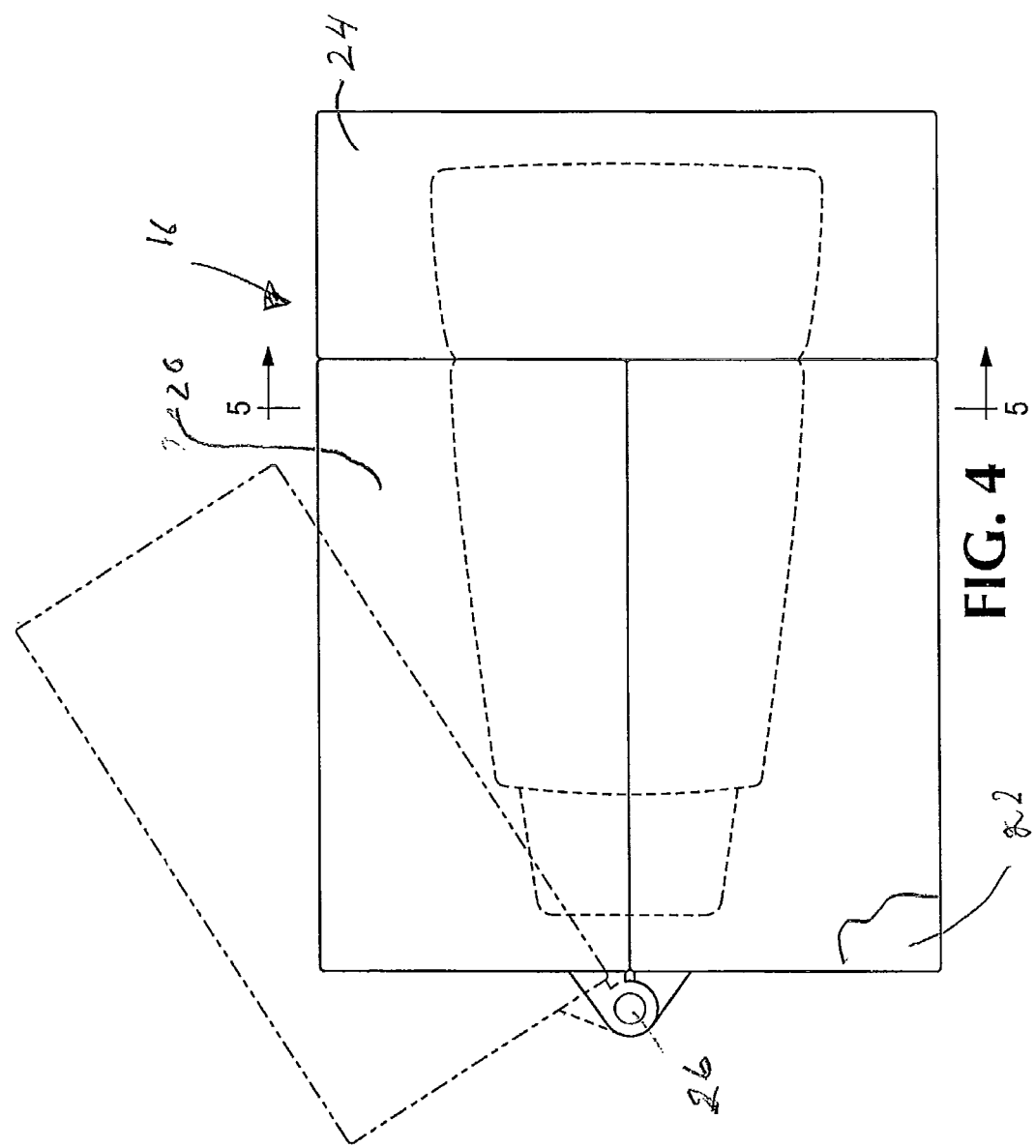
FIG. 4 is a plan view of the mold used in the subject invention.
Figure 5:
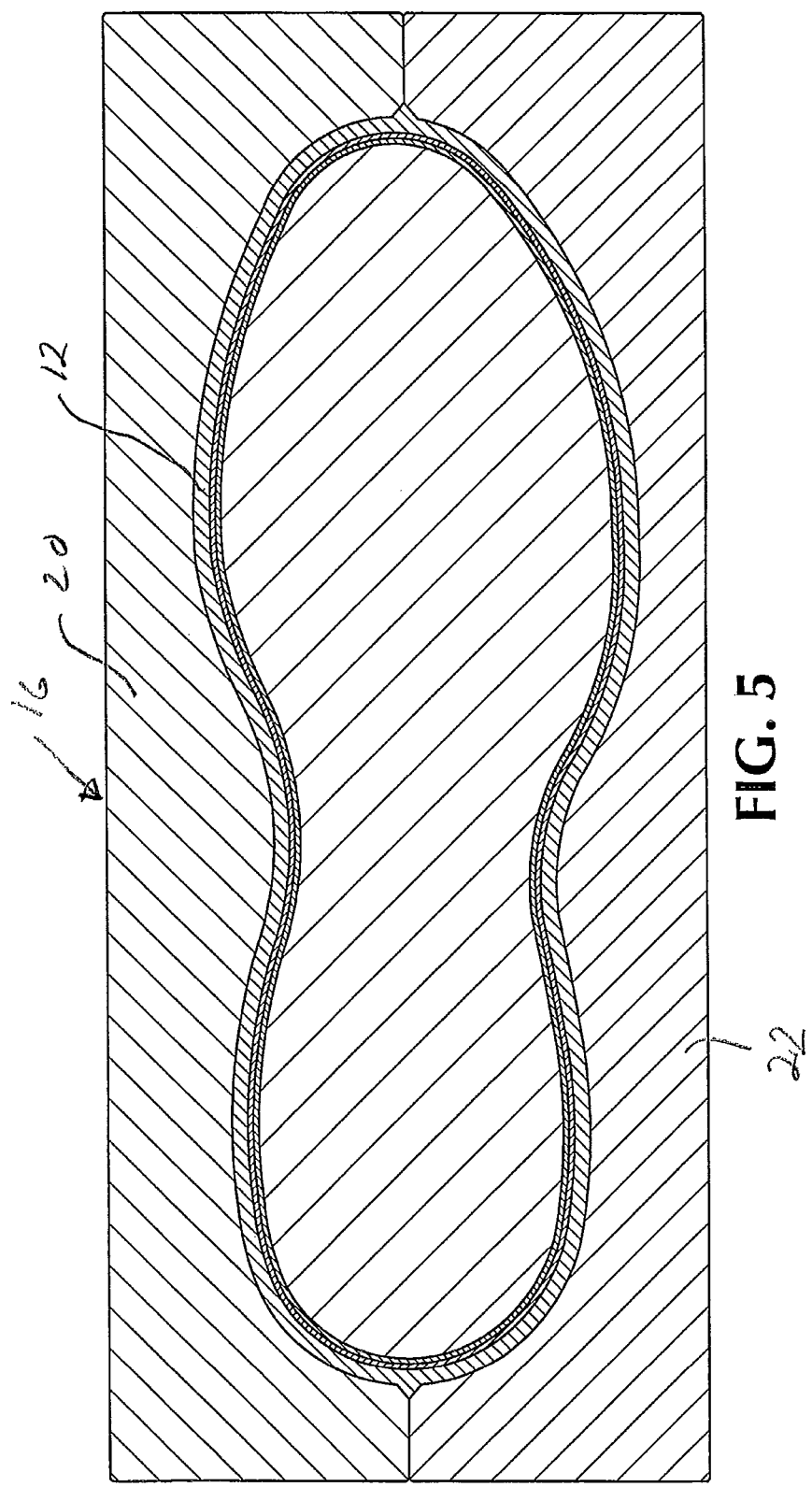
FIG. 5 is a sectional view along the line 5-5 in FIG. 4.

The mold 16 and last 18 are similar to the mold and last of the prior art. Referring to FIGS. 2-4 of the drawings, rather than using the thin sock of the prior art, the subject invention utilizes a scrim 10 which is made from an elastically deformable material. The scrim 10 is much thicker and is much more compressible than the sock used in the prior art. The scrim has a first thickness A (FIGS. 2 and 6) when not compressed, and a second thickness B (FIG. 3) when substantially fully compressed. The difference between thicknesses A and B is approximately equal to the desired thickness D of the skin 12 of the footwear. The exact thickness of the scrim depends on the particular application, but typically its uncompressed thickness would be between two millimeters and nine millimeters, and in most applications would be less than four millimeters. With the two-layer neoprene scrim shown in the drawings, the second thickness is approximately one millimeter. With other less compressible materials, it would be larger. In the embodiment shown in the drawings, the scrim has two layers of material 10a and 10b. However, it could be a single layer and it could have more than two layers. With the multiple layer embodiment, the layers could all be made from the same material or different layers could be made from different materials. The material from which the scrim is made could be neoprene, felt, foam, air-filled bladder or any other elastically compressible material. The amount of compressibility will, of course, be determined by the material from which it is made. Fluid thermoplastic material is injected into the mold at a high pressure, typically 300,000 pounds per square inch to 400,000 pounds per square inch, so the scrim will be very close to being completely compressed. The scrim material must have a melting point that is below the melting point of the thermoplastic material. The scrim fits snugly over the last 18 and preferably completely covers the entire portion of the last that is located inside of the mold. The scrim typically would extend beyond the top of the footwear and would be trimmed after the molding process is completed and the last is removed from the mold. In the embodiment shown in the drawings, the scrim will be trimmed such that it extends above the skin 12 of the completed footwear. The last and mold are configured such that there is a small gap C between the outer surface of the scrim and the inner surface of the mold when the last is inserted into the mold. The size of the gap depends on the scrim material, the desired thickness of the skin and the material being injected. However, at a minimum, there must be enough space between the scrim and the cavity wall to allow material to flow into and completely fill the mold. With a very compressible scrim material, this difference can be less than one millimeter.

Figure 6:
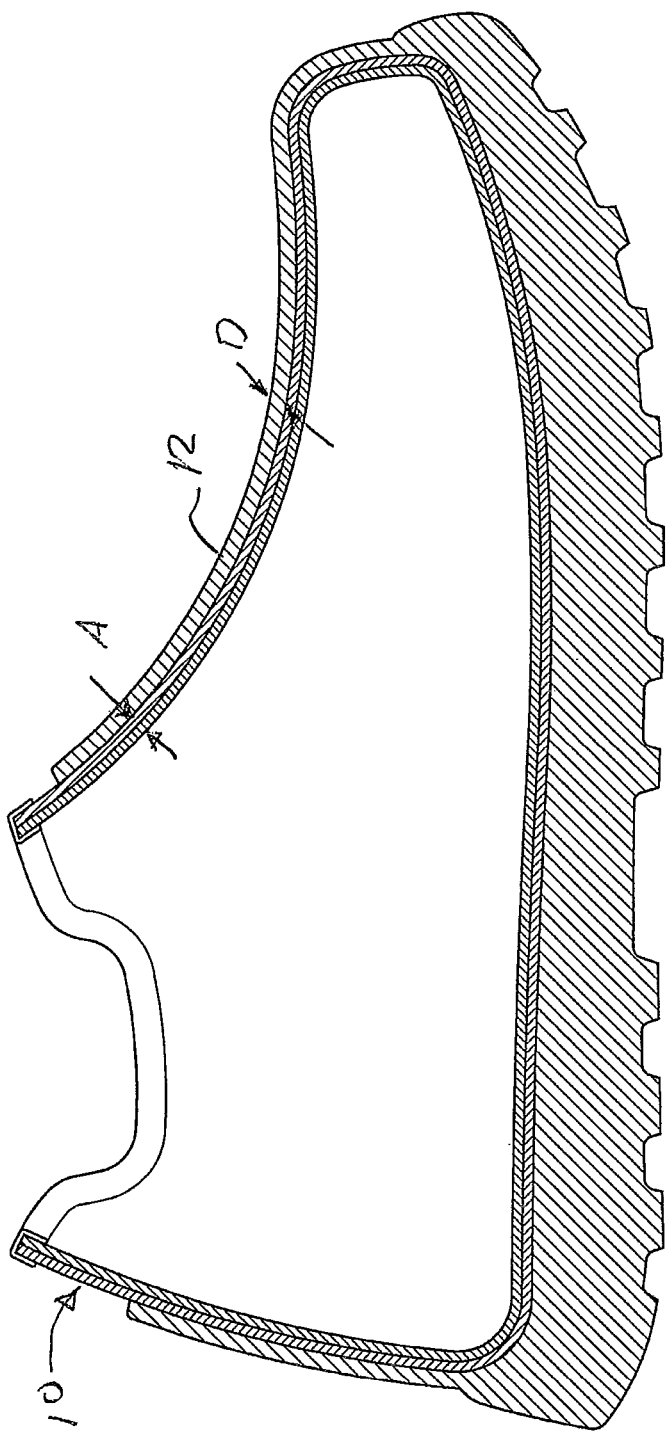
FIG. 6 is a cross-sectional view of the resulting footwear.

Referring now to FIG. 4, the mold typically would include three pieces with a top piece 20 having a cavity that defines one side of the footwear, a bottom piece 22 having a cavity that defines the opposite side of the footwear, and a base 24 having a cavity that defines the outsole. The ends of the top and bottom pieces 20, 22, which are at the top of the footwear, are joined by means of a hinge 26, which allows the mold to be opened to insert the last and scrim. The base is releaseably attachable to the top and bottom pieces after they have been closed using conventional attachments mechanisms. The scrim is placed on the last before the last is inserted into the cavity of the open top and bottom pieces. Once the last and scrim are placed in the mold and the mold closed (FIG. 2), the thermoplastic material is heated to where is becomes fluid and is injected into the mold through a conventional injection process. The pressure of the heated material compresses the scrim to its compressed thickness B (FIG. 3). The thermoplastic material is then cooled to where it has hardened. Because the uncompressed thickness A of the scrim is only slightly less than the predetermined width C between the last and the mold cavity, the thickness of the resulting shoe is approximately equal to the difference between the uncompressed and compressed thicknesses of the scrim. As is the case with the prior art sock, the scrim becomes bound to the shoe. Because the scrim is thicker and more compressible than the sock, it results in greater comfort. The mold is then opened and the newly formed footwear is removed from the mold. The last is removed and the scrim expands back to its uncompressed thickness A (FIG. 6). The scrim is then trimmed to the desired height.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A method of making injection molded footwear with an upper skin having a predetermined thickness, comprising:
   a) providing a last;
   b) providing a mold having an internal cavity which is configured to receive said last with there being a space between said cavity and said last having a predetermined width which is greater than said predetermined thickness;
   c) placing a scrim over said last before said last is placed in said mold, said scrim being made from an elastically deformable material having a first thickness when not compressed and a second thickness when substantially compressed;
   d) the difference between said first and second thicknesses being approximately equal to said predetermined thickness; and
   e) infecting a fluid thermal plastic material between said mold and said last at a pressure between 300,000 and 400,000 pounds per square inch to compress said scrim to said second thickness.

2. The method of claim 1 wherein said first thickness is less than said predetermined width.

3. The method of claim 1 including the further step of after the injected thermal plastic material has cooled, removing said last from said scrim to allow said scrim to return to said first thickness.

4. The method of claim 1 wherein said predetermined thickness is between one millimeter and eight millimeters.

5. The method of claim 4 wherein said predetermined thickness is less than five millimeters.

6. The method of claim 1 wherein said first thickness is between two millimeters and nine millimeters.

7. The method of claim 6 wherein said first thickness is less than four millimeters.

8. The method of claim 7 wherein said second thickness is approximately one millimeter.

9. The method of claim 1 wherein said scrim is formed from a single layer of material.

10. The method of claim 1 wherein said scrim is made from multiple layers of material.

* * * * *